United States Patent
Chen et al.

(10) Patent No.: US 7,961,865 B1
(45) Date of Patent: *Jun. 14, 2011

(54) METHOD FOR HANDLING INCOMING CALLS DIRECTED TO A VIRTUAL COMMUNICATION SERVICE SUBSCRIBER VIA A GUEST PBX

(75) Inventors: Yihsiu Chen, Middletown, NJ (US); Mark Jeffrey Foladare, East Brunswick, NJ (US); Shelley B. Goldman, East Brunswick, NJ (US); Shaoqing Q. Wang, Morganville, NJ (US); Roy Philip Weber, Bridgewater, NJ (US); Robert S. Westrich, Middletown, NJ (US); Aleksandr Zelezniak, Matawan, NJ (US)

(73) Assignee: AT&T Intellectual Property II, L.P, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/586,329

(22) Filed: Sep. 21, 2009

Related U.S. Application Data

(63) Continuation of application No. 10/889,325, filed on Jul. 12, 2004, now Pat. No. 7,613,288, which is a continuation of application No. 09/826,714, filed on Apr. 5, 2001, now Pat. No. 6,763,102.

(51) Int. Cl.
*H04M 7/00* (2006.01)
*H04L 12/66* (2006.01)

(52) U.S. Cl. ............... 379/221.15; 379/88.01; 379/225

(58) Field of Classification Search .......... 370/271, 370/352, 354, 395.1, 401; 379/88.01, 216.01, 379/221.11, 221.15, 225, 265.02, 265.04; 715/727

See application file for complete search history.

(56) References Cited

U.S. PATENT DOCUMENTS

| | | | |
|---|---|---|---|
| 4,696,028 A | 9/1987 | Morganstein et al. | |
| 5,220,596 A | 6/1993 | Patel | |
| 5,541,992 A | 7/1996 | Tsuzuki et al. | |
| 5,608,782 A | 3/1997 | Carlsen et al. | |
| 5,914,951 A | 6/1999 | Bentley et al. | |
| 5,987,115 A | 11/1999 | Petrunka et al. | |
| 5,991,390 A | 11/1999 | Booton | |
| 6,049,602 A | 4/2000 | Foladare et al. | |
| 6,195,357 B1 | 2/2001 | Polcyn | |
| 6,229,885 B1 | 5/2001 | Buhrmann et al. | |
| 6,301,339 B1 | 10/2001 | Staples et al. | |
| 6,307,853 B1 | 10/2001 | Storch et al. | |
| 6,314,165 B1 | 11/2001 | Junqua et al. | |
| 6,359,892 B1 | 3/2002 | Szlam | |
| 6,396,918 B1 | 5/2002 | King et al. | |
| 6,404,874 B1 | 6/2002 | Chestnut | |
| 6,516,061 B2 | 2/2003 | Horowitz et al. | |
| 6,542,475 B1 | 4/2003 | Bala et al. | |
| 6,614,783 B1 | 9/2003 | Sonesh et al. | |
| 6,763,102 B1 * | 7/2004 | Chen et al. | 379/221.15 |
| 7,106,743 B1 | 9/2006 | Kavulak et al. | |
| 7,200,218 B1 | 4/2007 | Lindley et al. | |
| 7,222,301 B2 | 5/2007 | Makagon et al. | |
| 7,613,288 B1 * | 11/2009 | Chen et al. | 379/221.15 |
| 2002/0106066 A1 | 8/2002 | Swanson et al. | |

* cited by examiner

*Primary Examiner* — Harry S Hong

(57) ABSTRACT

A method of handling incoming calls directed to a virtual communication subscriber is disclosed. An incoming call intended for the virtual communication subscriber is received at a first communication device. A call is placed to a second communication device using contact information provided by the virtual communication subscriber. Extension information is provided to a guest PBX when the call is answered which corresponds to a communication line associated with the second communication device. Upon connection to the second communication device, the incoming call is bridged with the call placed to the second communication device.

16 Claims, 3 Drawing Sheets

100

METHOD FOR HANDLING INCOMING CALLS DIRECTED TO A VIRTUAL COMMUNICATION SERVICE SUBSCRIBER VIA A GUEST PBX

CROSS REFERENCE TO RELATED APPLICATIONS

This application is a continuation of U.S. application Ser. No. 10/889,325, entitled "Method for Handling Incoming Calls Directed to a Virtual Communication Service Subscriber via a Guest PBX," filed Jul. 12, 2004, and issued Nov. 3, 2009 as U.S. Pat. No. 7,613,288, which is a continuation of U.S. application Ser. No. 09/826,714, entitled "Method for Handling Incoming Calls Directed to a Virtual Communication Service Subscriber via a Guest PBX," filed Apr. 5, 2001, and issued Jul. 13, 2004 as U.S. Pat. No. 6,763,102.

TECHNICAL FIELD

The present invention relates to virtual communication systems (VCS), and more particularly, to a system for handling incoming calls directed to a virtual communication subscriber who is connected to a communication network via a Public Branch Exchange (PBX) where the PBX is not part of the VCS service.

BACKGROUND OF THE INVENTION

Virtual communication systems (VCS) have been developed which allow a person to work in non-traditional work environments, such as at home or in a hotel room while still affording the worker the benefit of sophisticated communication services. Systems such as the ones described in co-pending patent application Ser. Nos. 09/318,015 and 09/370,766, which are incorporated by reference, describe systems which allow for a remote worker to utilize sophisticated communication services provided by the network without requiring the worker to have special communication equipment.

One requirement of these virtual communications systems is that the remote worker identify a telephone number at which the worker can send and receive telephone calls. This can cause problems when the remote worker is located at a facility which uses a Public Branch Exchange (PBX) which is not associated with the VCS service (hereinafter referred to as "guest PBX). This is because guest PBX facilities typically have a general telephone number which accesses the guest PBX and extensions which are associated with each line that is connected to the guest PBX. To reach a particular party at a line associated with the guest PBX, an incoming caller must dial the general number and then be transferred to the particular party's line by either a person such as a receptionist or operator or through an automated system such as an Interactive Voice Response (IVR) system. Because a party using a guest PBX cannot be reached directly, a remote worker located at a guest PBX cannot effectively get access to all VCS services.

One solution to this problem is to equip the remote worker with a cellular telephone which can be used in conjunction with the VCS services to send and receive calls. However, this is not always an optimal solution, since cellular telephones have limited battery life and do not have secure connections. Therefore, a need exists for a technique for handling incoming calls directed to a virtual communication subscriber who is connected to a communication network via a guest Public Branch Exchange (PBX).

SUMMARY OF THE INVENTION

The present invention is directed to a method for handling incoming calls directed to a virtual communication subscriber who is connected to a communication network via a guest Public Branch Exchange (PBX). A remote worker logs onto a VCS platform and provides the VCS platform with his location information which includes a reach telephone number and extension information which is stored in a database server. The VCS platform provides the extension information to an IVR associated with the VCS platform. When a caller dials the remote worker's office telephone, the call is transferred to the VCS platform. The VCS platform retrieves the contact information for the remote worker and places a call to the current location of the remote worker which is received by the guest PBX. An IP message is also sent from the VCS platform to the IVR providing the IVR with the extension information.

When the call is answered, the IVR provides the extension information to the called party. Once the VCS platform has established a connection to the remote worker's line, the VCS platform will bridge the incoming call with the connection to the remote worker. While the call is being set up by the VCS platform, the VCS platform sends a message to the remote worker's PC indicating that an incoming call has been received. Included may be further information regarding the call. Once the call has been received by the remote worker's telephone, the remote worker can indicate acceptance of the call.

In another alternative embodiment of the present invention, the calling party may be using a multimedia communication device. In response to an incoming call, the VCS platform can send the calling party's device an instant message which contains the reach information and a short message indicating that when the operator answers the phone, please request the remote worker using the reach information. The VCS platform then forwards the call to the current location of the remote worker which is received by the remote PBX. When the call is answered, the calling party provides the reach information. At the same time, the VCS platform sends a message to the remote worker's PC indicating the presence of the call. The remote worker can then elect to answer the call or transfer the call to a voice mail server associated with the VCS platform. The calling party is then connected to the remote worker's line.

DETAILED DESCRIPTION

Figure 1:
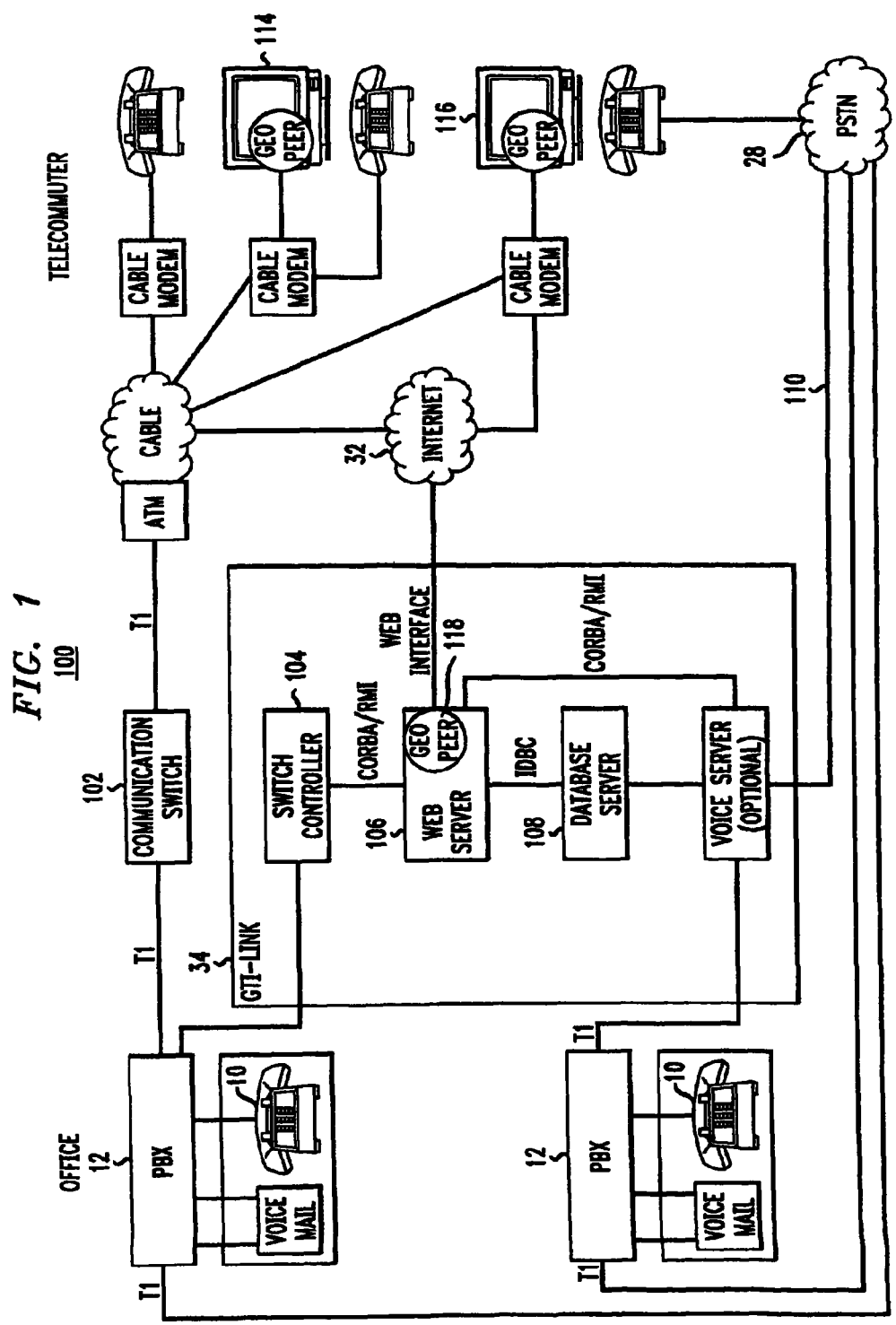
FIG. 1 is a block diagram of an exemplary virtual communication service (VCS) system of the present invention.

Referring to the figures in which like numerals indicate like elements, FIG. 1 illustrates an exemplary architecture for a virtual communication system (VCS) in accordance with the present invention. A traditional office environment is shown as including a plurality of stations 10 coupled to a PBX 12 (host PBX) within an office complex. Each station 10 includes a telephone with conventional PBX features such as call forwarding, mute, hold, transfer, etc. As discussed above, an increasing number of workers may spend a portion of the workweek at locations other than the office.

These workers may be "telecommuters" (working at home or another fixed location) or traveling with no fixed location. In accordance with the present invention, these workers can now have a VCS station using a voice network and data network to connect the worker, via a remote VCS office platform, with the PBX in the office (or network, as the case may be). Throughout the remainder of this discussion, the term "remote worker" will be used and is considered to encompass the traditional "telecommuter" working at a home office, a "field employee" temporarily at a company location other than their usual office, "traveling" employees at a client site, hotel or any other facility. In general, an individual working from any location with at least voice telephone access and, preferably, modem access to a data network is considered to fall within the definition of a "remote worker" in accordance with the principles of the present invention. In addition, as will be described in detail hereinafter, the present invention will focus on those remote workers who are located at a facility which uses a PBX to which the remote worker does not have the immediate benefits of its functionality (e.g., client site, hotel, etc.). Hereinafter, a PBX which is operated by a third party and to which the remote worker does not have the benefit of its features, and, furthermore to which the remote worker may be accorded a significantly limited set of communication features will be referred to as a "guest" PBX.

A remote worker may obtain sophisticated communication services which may be achieved through a number of alternative connections between the remote workers VCS station and an office-based or host PBX. Referring specifically to FIG. 1, two different types of remote worker set-ups—(1) a cable modem-based remote worker 114, where both voice and data are supplied over a single line; and (2) a two-line data and voice remote worker 116, where a conventional modem is used to provide the data connection and a separate voice line, provided over a traditional PSTN for example, is used to handle the voice traffic. It is to be understood that the various components discussed above may or may not comprise physically separate components, but are viewed in these examples as "logically separate" components. Alternatively, a "one-line" arrangement, supporting IP telephony over a data network may be used to deploy the features of the VCS system. It is to be understood by those skilled in the art that any arrangement capable of providing both voice and data communication with the remote location are acceptable.

A remote VCS office platform 34 is in communication with both data network 32 and office PBX switch 12. In particular, VCS office platform 34 is used to control the communication between office PBX 12 and remote worker 18 so as to provide the enhanced communication features at the remote worker's location. The VCS platform 34 includes switch controller 104, web server 106 and database 108. The VCS platform is preferably operated on a workstation, such as but not limited to a Sun Sparcstation. A voice connection 110, such as a T1 line is shown as coupling voice network 28 to a communication switch 102. The communication switch 102 may be part of the PSTN 28, wireless network (not shown) or other type of data network (not shown). A data connection 112 is shown as coupling data network 32 to web server 106.

The following discussion will provide details associated with call flow to/from a remote worker. A remote worker must first log in to the VCS system in order to avail himself of any of the call features discussed above. The remote worker initiates a VCS environment by logging in, via endpoint terminal 42 (such as a PC), over data network 32 to VCS office platform 34. In particular, the endpoint terminal 42 connects to a security system 118 within web server 106. Various security arrangements can be used to authenticate the remote worker and his capability to access the VCS system. For example a personal ID number and password may be used. Thus, only "authorized" individuals will access the IP VPN and the VPN will perform the necessary follow-up procedures to grant login permission to the remote worker.

Once the remote worker has been authenticated, web server 106 sends a message to switch controller 104, indicating that the control of all telecommunications with the identified remote worker are to be passed by PBX 12 to VCS platform 34. As a result, PBX 12 will now hand off all call control to VCS platform 34 for calls received for the remote worker's identified station 10 within the office (whether the calls originate within the office or outside of the office) and PBX 12 will react based upon instruction from VCS platform 34. In particular, the "control message" prompts PBX 12 to "forward" all calls to/from remote worker's office extension directly to platform 34 for call control. Once remote worker 18 is authenticated, platform 34 transmits to remote endpoint terminal 42 (in this case, a PC) via data network 32 a "soft phone" interface so as to create a "virtual PBX" environment using the remote worker's home equipment (i.e., telephone and PC). Various call flows, both into and out of the home environment are now possible.

In general, VCS office platform 34 is used to emulate the PBX environment on the remote endpoint terminal and functions to communicate between PBX 12 and endpoint terminal 42 to control all communication. Using this arrangement, a remote worker is able to receive calls placed to them at their "office" number, regardless of the remote worker's current location. As such, a caller places a call to the remote worker in the usual fashion, dialing the office telephone number associated with the remote worker (for internal calls, abbreviated dialing in terms of a 4 or 5-digit number may be dialed; for external calls the traditional 7 or 10-digit number is dialed). PBX 12, upon recognition of the dialed number, will "hand-off" the incoming call to VCS platform 34 via a CTI link 120 to switch controller 104. The call is then passed to service controller 106 which performs a look-up in database 38 to determine the "reach" number for the remote worker (as controlled by the worker, the "reach" number may be a home phone number, an alternative work location number, a cell phone, or a hotel number for a traveling remote worker). Once the "reach" number is obtained, web server 106 sends an incoming call message to the remote worker's "soft phone" via data network 32.

Figure 2:
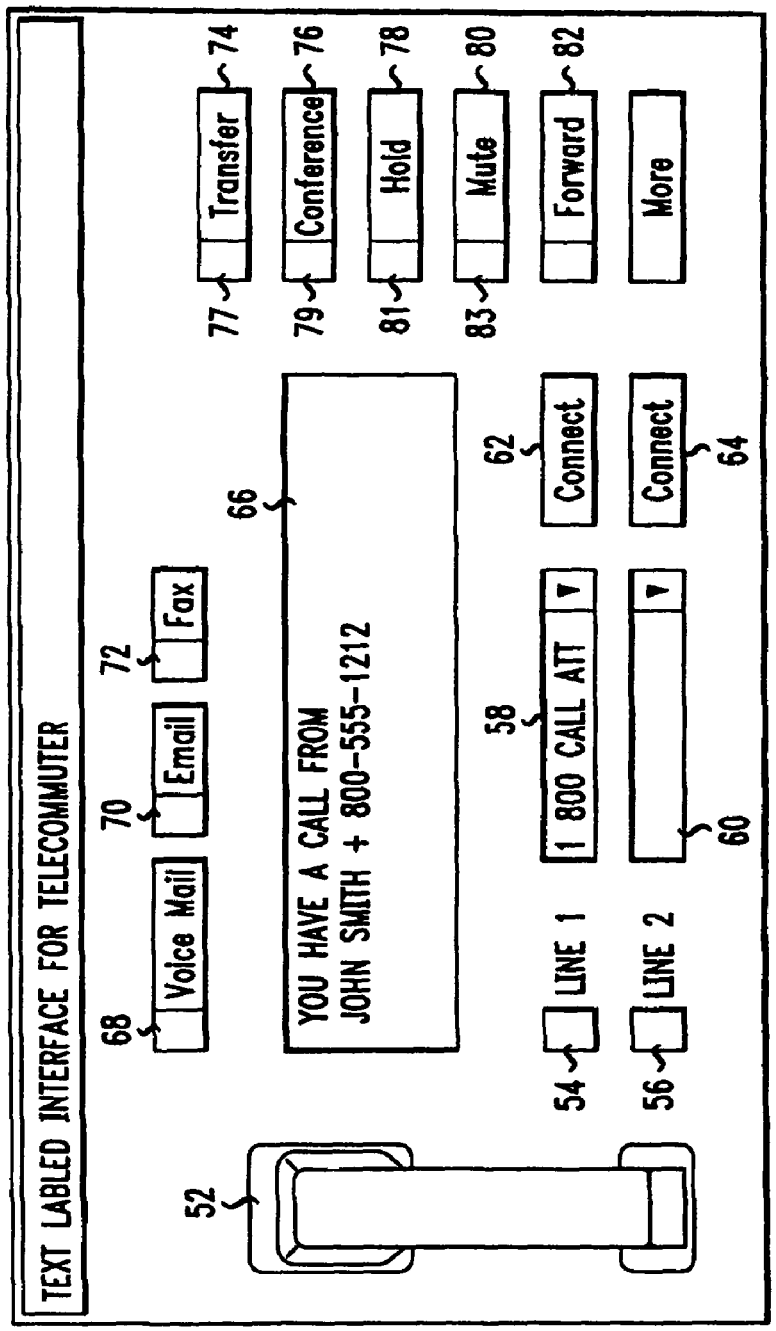
FIG. 2 illustrates a typical soft phone GUI that may be used by a remote worker implementing the VCS system of the present invention.

An exemplary soft phone is illustrated in FIG. 2 which exemplifies some of the various PBX station-type functionalities available for the remote worker. The soft phone is preferably a JAVA applet which is generated by web server 106. A graphical handset 52 is included and may be activated to go off-hook by a mouse click—either to answer an incoming call (forwarded from the office PBX) or place an outbound call (to be forwarded to the office PBX for completion). Display 50 may also include a set of line indicators, in this example, a pair of line indicators 54 and 56 (showing that two separate lines are coming into endpoint terminal 420, where the indicators will illustrate the presence of an incoming call (by changing color, for example) or the hold state of one call while another is being answered (by blinking, for example). Associated with each line indicator 54, 56 may be a separate speed dial list, shown by elements 58 and 60. Speed dial list 58, for example may be a pull-down menu of a first set of often-called telephone numbers. Speed dial list 60, which also may be a pull-down menu, may include fax numbers, beeper numbers, or any other telecommunication numbers the remote worker needs. Each speed dial list 58 and 60 has a separate connect button 62 and 64, respectively.

Part of the graphical user interface included within display 50 is a message area 66, which may advantageously provide more information than available at a station directly coupled to a conventional PBX. As shown, in the presence of an incoming call, message area 66 displays a message including caller ID information such as ANI and, perhaps, the name of the calling party. Display 50 may also include message waiting lights (as commonly found on station sets served by a PBX), such as message waiting indicators 68, 70 and 72 associated with voice mail, email, and fax messages. Further as found on PBX-based station sets, display 50 includes a set of buttons with various call treatments. Display 50 includes a transfer button 74, conference button 76, hold button 78, mute button 80 and a forward button 82. A set of display indicators 77, 79, 81 and 83 are associated with these call treatment functions (used to indicate whether or not the various types of call treatment have been activated). For example, if mute button 80 has been activated (such as by a mouse click), indicator light 81 will change in appearance as a reminder that the mute function (i.e., suppressing transmission on the return path) has been activated.

The soft phone allows the remote worker to have additional call flexibility beyond that associated with a traditional PBX (such as the speed dial pull-down menus described above). It is also possible to activate additional sets of call functionality via a call feature button indicated by more button 84. Activation of the more button may bring up for the remote worker an additional set of call functionality (for example, initiating conference calls, accessing corporate messages, broadcasting messages to all station sets behind the office PBX, etc.).

Figure 3:
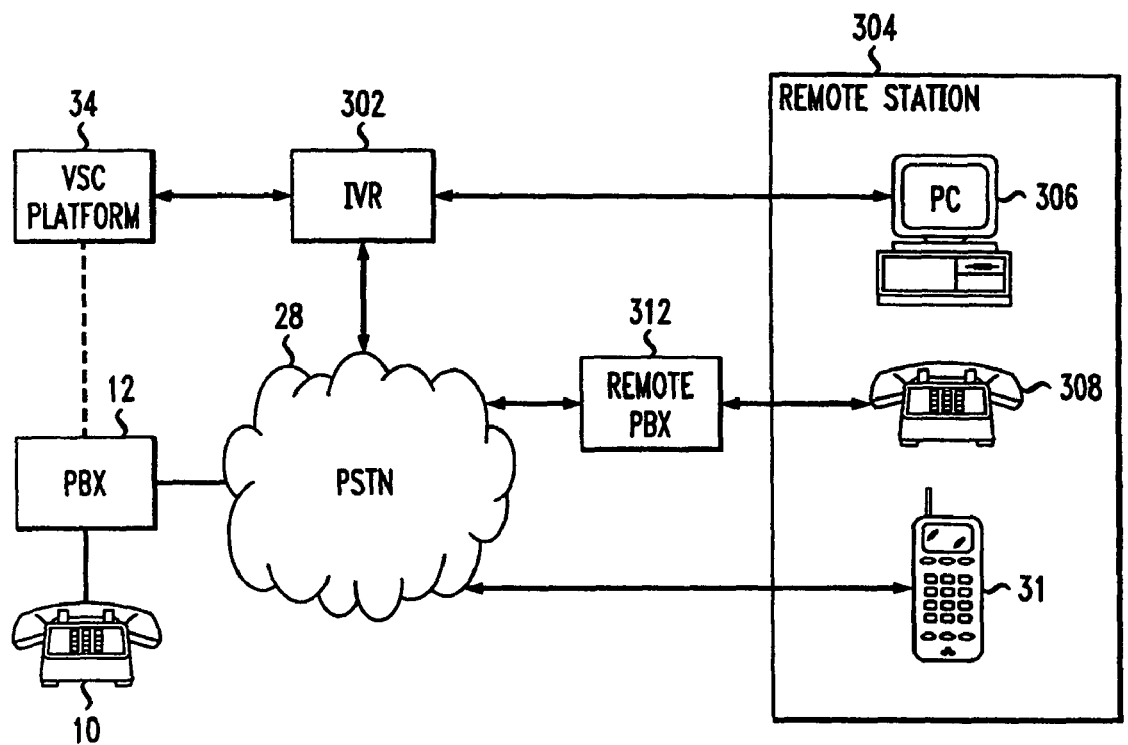
FIG. 3 is a diagram of a network architecture which implements the method of the present invention.

As indicated above, once the remote worker logs into the VCS platform 34, the remote worker is then able to receive incoming calls. However, in order for the remote worker to receive an incoming call, the remote worker must provide the VCS system with a telephone number at which the remote worker can be reached (i.e., reach number). This becomes a problem when the remote worker is working at a location associated with its own PBX (guest PBX) as illustrated in FIG. 3. The guest PBX system typically has a limited number of incoming lines (e.g., one incoming general telephone number) to which are associated a plurality of extensions. As such, to reach a particular line associated with the guest PBX, a caller must dial a general telephone number, and then have the call directed to the particular line by either a human operator or an Integrated Voice Response (IVR) system. Because the VCS system assumes that the number provided by the remote worker is a direct connection to that remote worker, the VCS platform does not have any way to notify the party (or IVR system) that answers the call any indication as to where to direct the call (e.g., an extension, name or room number).

Many offices and hotels utilize PBX systems thereby making this issue a real concern for remote workers. As will be described hereinafter, the present invention solves this problem and allows a remote worker to receive incoming calls even when the telephone station to which the remote worker is directing calls is connected to a guest PBX. It is to be understood by those skilled in the art that instead of a PBX, the system could be an Internet Protocol PBX (IPPBX), Centrex, or IPCentrex switch without departing from the scope and spirit of the present invention.

In accordance with the present invention, the remote worker logs onto the VCS platform 34 using his PC 304. Once logged in, a soft phone downloads on the remote workers PC 306. The remote worker uses the soft phone set up to provide the VCS platform 34 with his location information which includes a reach telephone number (e.g., the hotel main number) and extension information (e.g., his room number). In a preferred embodiment of the present invention, the soft phone would include a menu selection which is labeled either "Hotel Room Setup" or "Remote PBX Setup" which the remote worker would access to provide his contact information. The VCS platform 34 stores this information in a database server 108 (FIG. 1).

In accordance with one embodiment of the present invention, the VCS platform 34 provides the extension information to an IVR 302 associated with the VCS platform 34. When a caller dials the remote workers office telephone 10, the call is transferred to the VCS platform 34 via the host PBX 12. The VCS platform looks up in the VCS database server 108 the contact information for the remote worker. The VCS platform 34 then places a call to the hotel which is received by the guest PBX 312. Simultaneously, an IP message is sent from the VCS platform 34 to the IVR 302 providing the IVR with the extension information.

When the call at the hotel is answered (either by a human operator or an IVR system (not shown)), the IVR 302 associated with the VCS platform 34 provides the room number to the hotel answering system (i.e., operator or IVR). The IVR 302 may use text-to-speech generation to provide the room number to the operator. Alternatively, the IVR can specifically request the remote worker by name (e.g., "Please connect me to John Smith's room"). In the case of an IVR system answering the call, the IVR 302 may provide DTMF signals which correspond to the room number (e.g., keypad tones which correspond to the numbers "2", "3", "4" to indicate room 234). Once the VCS platform 34 has established a connection to the remote workers line, the VCS platform will bridge the incoming call with the connection to the remote worker and the IVR 302 will be dropped from the call flow path. The IVR 302 may automatically be dropped from the call or the remote worker may affirmatively communicate to the VCS platform that the IVR 302 should be dropped from the call.

While the call is being set up by the VCS platform 34, the VCS platform sends a message to the soft phone on the remote worker's PC 306 indicating that an incoming call has been received. Included may be further information regarding the call (e.g., ANI). Once the call has been received by the remote worker's telephone 308, the remote worker can indicate acceptance of the call by clicking on a continue button (not shown) on the soft phone displayed on the worker's PC 306.

In an alternative embodiment of the present invention, the calling party may be the entity to provide the remote PBX 312 with the extension information. When the calling party places a call to the remote worker's office telephone 10, the call is transferred to the VCS platform 34. At the same time, a message is sent from the office PBX 12 to the IVR 302 associated with the VCS platform 34 which prompts the IVR to play the extension number information to the called party. For example, the IVR may state: "John Smith is currently out of the office. I am transferring your call to John at his virtual office location. When the call is answered, please ask the operator (IVR) to transfer you to room 234 (John Smith)."

The VCS platform looks up in the VCS database server 108 the contact information for the remote worker. The VCS platform 34 then forwards the call to the hotel which is received by the remote PBX 312. When the hotel operator or hotel IVR answers the call, the calling party either requests the remote worker's room number or asks for his room by name. At the same time, the VCS platform 34 sends a message to the remote worker's PC 306 indicating the presence of the call. The remote worker can then elect to answer the call by clicking on the appropriate selection on the soft phone or transfer the call to a voice mail server associated with the VCS platform 34. The hotel operator then connects the calling party to the remote worker's line. If the remote worker elects to take the call, the remote worker can then pick up the receiver of the hotel telephone 308 and use the softphone on the worker's PC 306 to implement communication features to the call such as hold, mute, etc. If the remote worker elects to transfer the call to voice mail the call is re-directed to the voice mail server associated with the VCS platform 34.

In another alternative embodiment of the present invention, the calling party may be using a multimedia communication device, such as, but not limited to an internet-capable cell phone, multimedia computer with VOIP software. In response to an incoming call, the VCS platform 34 can send the calling party's device an instant message which contains the reach information (i.e., room number) and a short message indicating that when the operator answers the phone, please request the remote worker using the reach information. For example, the instant message may read: "when your call is answered please request room 234."

The VCS platform looks up in the VCS database server 108 the contact information for the remote worker. The VCS platform 34 then forwards the call to the hotel which is received by the remote PBX 312. When the hotel operator or hotel IVR answers the call, the calling party either requests the remote worker's room number or asks for his room by name. At the same time, the VCS platform 34 sends a message to the remote worker's PC 306 indicating the presence of the call. The remote worker can then elect to answer the call by clicking on the appropriate selection on the soft phone or transfer the call to a voice mail server associated with the VCS platform 34. The hotel operator then connects the calling party to the remote worker's line. If the remote worker elects to take the call, the remote worker can then pick up the receiver of the hotel telephone 308 and use the softphone on the worker's PC 306 to implement communication features to the call such as hold, mute, etc. If the remote worker elects to transfer the call to voice mail the call is re-directed to the voice mail server associated with the VCS platform 34.

While the present invention has been described in connection with the illustrated embodiments, it will be appreciated and understood that modifications may be made without departing from the true spirit and scope of the invention. For example, while the present invention is described with reference to incoming calls to a remote worker's hotel room, it can be appreciated that the present invention may be used in any situation in which a remote worker is working at a location associated with a PBX. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

We claim:

1. A method for handling incoming calls directed to a virtual communication subscriber, the virtual communication subscriber being associated with a fixed communication device connected to a host private branch exchange, the virtual communication subscriber being at a remote location and being connected to a communication network via a guest private branch exchange not affiliated with the host private branch exchange, the method comprising:

in a switch controller, receiving contact information relating to the guest private branch exchange;

controlling a call directed from the host private branch exchange to the fixed communication device by directing the call to the guest private branch exchange using the contact information; and directing the call to the virtual communication subscriber via the guest private branch exchange by providing at least a portion of the contact information to the guest private branch exchange as speech.

2. The method of claim 1, wherein receiving the contact information further comprises receiving the contact information through a Web server.

3. The method of claim 2, further comprising:
authenticating the subscriber at the Web server.

4. The method of claim 2, further comprising:
transmitting from the Web server to the user a soft phone user interface providing private branch exchange functionality.

5. The method of claim 1, wherein the contact information includes a reach telephone number and the switch controller dials the reach telephone number to direct the call to the guest private branch exchange.

6. The method of claim 1, wherein contact information includes extension information for a communication device associated with the virtual communication subscriber, and directing the call to the virtual communication subscriber via the guest private branch exchange comprises providing the extension information as speech.

7. The method of claim 6, wherein the extension information includes the subscriber's name.

8. The method of claim 6, wherein the extension information includes an extension number associated with the subscriber.

9. The method of claim 6, wherein the extension information includes a room number associated with the subscriber.

10. The method of claim 1, wherein the contact information is received as text, and the portion of the contact information provided as speech is converted from the text.

11. A method for handling incoming calls directed from a calling party to a virtual communication subscriber, the virtual communication subscriber being associated with a fixed communication device connected to a host private branch exchange, the virtual communication subscriber being at a remote location and being connected to a communication network via a guest private branch exchange not affiliated with the host private branch exchange, the method comprising:

in a switch controller, receiving contact information relating to the guest private branch exchange;

controlling a call directed from the calling party through the host private branch exchange to the fixed communication device by directing the call to the guest private branch exchange using the contact information; and directing the call to the virtual communication subscriber via the guest private branch exchange by providing at least a portion of the contact information to the calling party as speech.

12. The method of claim 11, further comprising:
providing instructions to the calling party to provide the contact information to an operator of the guest private branch exchange.

13. The method of claim 11, wherein contact information includes extension information for a communication device associated with the virtual communication subscriber, and directing the call to the virtual communication subscriber via the guest private branch exchange comprises providing the extension information to the calling party as speech.

14. The method of claim 13, wherein the extension information includes the subscriber's name.

15. The method of claim 13, wherein the extension information includes an extension number associated with the subscriber.

16. The method of claim 13, wherein the extension information includes a room number associated with the subscriber.

* * * * *